(12) United States Patent
Shin et al.

(10) Patent No.: US 6,454,817 B1
(45) Date of Patent: Sep. 24, 2002

(54) METHOD FOR MANUFACTURING SOLID ELECTROLYTIC CAPACITOR USING FUNCTIONAL POLYMER ELECTROLYTIC COMPOSITION

(75) Inventors: Dal-Woo Shin, Cheongju; Jong-Joo Park, Seoul; Young-Hoon Lee; Yong-Chul Kim, both of Cheongju; Sung-Ho Kim, Seoul, all of (KR)

(73) Assignee: Samwha Electric Co., Ltd., Chungbuk (KR)

(*) Notice: Subject to any disclaimer, the term of this patent is extended or adjusted under 35 U.S.C. 154(b) by 0 days.

(21) Appl. No.: 09/861,705

(22) Filed: May 22, 2001

(30) Foreign Application Priority Data

May 22, 2000 (KR) .............................................. 00-27369

(51) Int. Cl.[7] .............................. H01G 9/00; H01G 9/02; H01G 9/04

(52) U.S. Cl. ...................... 29/25.03; 361/523; 361/525; 361/529; 361/531; 427/80

(58) Field of Search ............................ 29/25.01–25.03; 361/523–540

(56) References Cited

U.S. PATENT DOCUMENTS

| | | | |
|---|---|---|---|
| 4,609,971 A | * | 9/1986 | Shaffer |
| 6,219,224 B1 | * | 4/2001 | Honda |
| 6,287,630 B1 | * | 9/2001 | Strange et al. |

* cited by examiner

Primary Examiner—Ha Tran Nguyen
(74) Attorney, Agent, or Firm—Birch, Stewart, Kolasch & Birch, LLP

(57) ABSTRACT

Disclosed is a method for manufacturing a solid electrolytic capacitor using a functional polymer composition. The method comprises immersing the rolled aluminum electrolytic capacitor device in polyaniline solution with high electric conductivity to impregnate the device with polyaniline, drying the impregnated device in a drying oven which is maintained at constant temperature to fully remove the solvent, inserting the dried device to a capacitor aluminum can and then sealing with epoxy resin, to manufacture a solid electrolytic capacitor using a functional polymer. As such, the impregnation can be performed well at not only normal temperature and pressure, but also high temperature and reduced pressure. The solid electrolytic capacitor has the advantages of high capacity, low impedance and low ESR, and also, low manufacturing cost, simple processes and high reliability.

12 Claims, 1 Drawing Sheet

10

METHOD FOR MANUFACTURING SOLID ELECTROLYTIC CAPACITOR USING FUNCTIONAL POLYMER ELECTROLYTIC COMPOSITION

BACKGROUND OF THE INVENTION

1. Field of the Invention

The present invention relates to a method for manufacturing a solid electrolytic capacitor with high performance and high reliability, by applying a solution of a. functional polymer composition useful as a solid electrolyte, and a rolled aluminum device.

2. Description of the Prior Art

Usually, a solid electrolytic capacitor has a structure comprising an electrode of metals, such as aluminum (Al) or tantalum (Ta), acting as an anode; an oxide film formed thereon via chemical treatment, as a dielectric layer; and a solid electrolyte-attached conductive layer of substances including graphite or silver formed on the, dielectric layer, as a part of a cathode. In this case as the solid electrolyte, use may be made of metal oxides such as manganese dioxide and lead oxide, TCNQ (7,7',8,8'-tetracyanoquinodimethane) complex, which is an organic semiconductor, and polypyrrole, which is a conductive polymer.

Though generally used in tantalum (Ta) electrolytic capacitors, manganese dioxide can be applied to aluminum electrolytic capacitors, but with significant difficulty. Commonly, the impregnation of manganese dioxide into capacitors is carried out by immersing the capacitor device in manganese acetate solution, followed by performing a thermal decomposition therein. As a solid electrolyte, manganese dioxide is usually attached to an electrode. But, in the case of aluminum (Al) electrolytic capacitor, such thermal decomposition impairs a dielectric aluminum oxide film with concurrent drastic decrease in pressure resistance.

On the other hand, impregnation methods of TCNQ complex used in organic semiconductor devices utilize a dissolution-impregnation using heat, in which TCNQ complex is liquefied by heat and the devices are immersed in the liquefied TCNQ complex for impregnation. However, TCNQ complex is poorly resistant to heat. In particular, TCNQ complex suitable for the dissolution-impregnation should have a dissolution point of 270° C. or lower owing to its decomposition point being about 290° C., but this temperature is too low to provide resistance to soldering.

Recently, the development of new materials in the field of polymers has made considerable progress. As a result, conductive polymers comprising conjugated polymers doped with an electron-donating or electron-attracting compound (dopant) have been developed, which have stronger heat resistance than TCNQ complex, better electric conductivity than manganese dioxide and TCNQ complex, and low ESR (equivalent series radiation) of capacitor and impedance in a high frequency region. Among the developed polymers is polypyrrole. Polypyrrole, a functional polymer having heat resistance and good conductivity, is also used as a solid electrolyte. However, the impregnation of polypyrrole causes the pressure resistance of dielectric oxide film to be greatly lowered, as in manganese dioxide. Additionally, the application range of polypyrrole is limited. For example, the electrode in the flat form can be impregnated with polypyrrole, whereas the rolled form is very difficult to impregnate with polypyrrole.

SUMMARY OF THE INVENTION

It is an object of the present invention to alleviate said problems of the prior arts and to provide a method for preparing an organic semiconductor solid electrolytic capacitor which has high capacity, and low ESR and impedance in a high frequency region, by impregnating an aluminum electrode thin film-rolled device with a conductive polymer useful as a solid electrolyte.

In an aspect of the present invention, there is provided a method for manufacturing a solid electrolytic capacitor using a functional polymer, which comprises: rolling electrode lead-attached thin films of an etched aluminum and a cathode, together with a separator paper, to make a rolled device (S1); mixing an admixture of polyaniline Emeraldine base powder (1.0–5.0 wt %) and a dopant in a molar ratio of 1:2, pulverized by use of a rod mill or a ball mill, with a solution of 0.2–0.6 wt % of surfactant in equimolar amounts of a first solvent and a second solvent, and dissolving the pulverized mixture with stirring by use of a dissolution apparatus, to prepare a solution of a conductive polyaniline solid electrolyte (S2); and immersing said rolled device in said solution of conductive polyaniline solid electrolyte at a rate of 0.5–10 mm/sec, taking out the device from the solution at the same rate, and drying the device at 80–150° C. for 5–30 minutes in a drying oven, followed by inserting the fully dried impregnated device to an aluminum can, to seal and cure the inserted device with epoxy resin, urethane or acryl resin (S3).

In another aspect of the present invention, there is provided a method for preparing a solid electrolytic capacitor using a functional polymer, which comprises; rolling electrode lead-attached thin films of an etched aluminum and a cathode, together with a separator paper, to make a rolled device (S1); mixing 2.0–20.0 wt % of a paste type solution of polyaniline Emeraldine base powder in dodecylbenzenesulfonic acid in a molar ratio of 1:4, pulverized by use of a rod mill or a 3 roll mill, with 69–91 wt % of a first solvent, and dissolving the pulverized mixture with stirring by use of a dissolution apparatus, followed by adding a second solvent in the amount corresponding to 10 wt % of the first solvent to decrease volatility of the solution, to prepare a precoating solution (S2); immersing said rolled device in said precoating solution at a rate of 0.5–10 mm/sec, taking out the device from the solution at the same rate, and drying the device at 50–100° C. for 10 seconds—5 minutes in a drying oven (S3); mixing an admixture of polyaniline Emeraldine base powder (1.0–5.0 wt %) and a dopant in a molar ratio of 1:2, pulverized by use of a rod mill or a ball mill, with a solution of 0.2–0.6 wt % of surfactant in equimolar amounts of a third solvent and a fourth solvent, and dissolving the pulverized mixture with stirring by use of a dissolution apparatus, to prepare a solution of a conductive polyaniline solid electrolyte (S4); and immersing the rolled device precoated at previous step (S3) in said solution of conductive polyaniline solid electrolyte at a rate of 0.5–10 mm/sec, taking out the device from the solution at the same rate, and drying the device at 80–150° C. for 5–30 minutes in a drying oven, followed by inserting the fully dried impregnated device to an aluminum can, to seal and cure the inserted device with epoxy resin, urethane or acryl resin (S5).

As mentioned above, the electrode lead is attached to each of the aluminum etching thin film and the cathode thin film and then rolled, together with a separator paper, to prepare a rolled device, which is simply immersed in the solution of conductive polymer solid electrolyte at normal temperature and pressure, thereby forming a solid electrolyte layer with high impregnation efficiency. In consequence, the solid electrolytic capacitor which is advantageous in terms of easier impregnation, more excellent leakage current properties and larger electrostatic capacity, can be prepared according to the present invention, compared with conventional solid electrolytic capacitors.

DETAILED DESCRIPTION OF THE INVENTION

Figure 1:
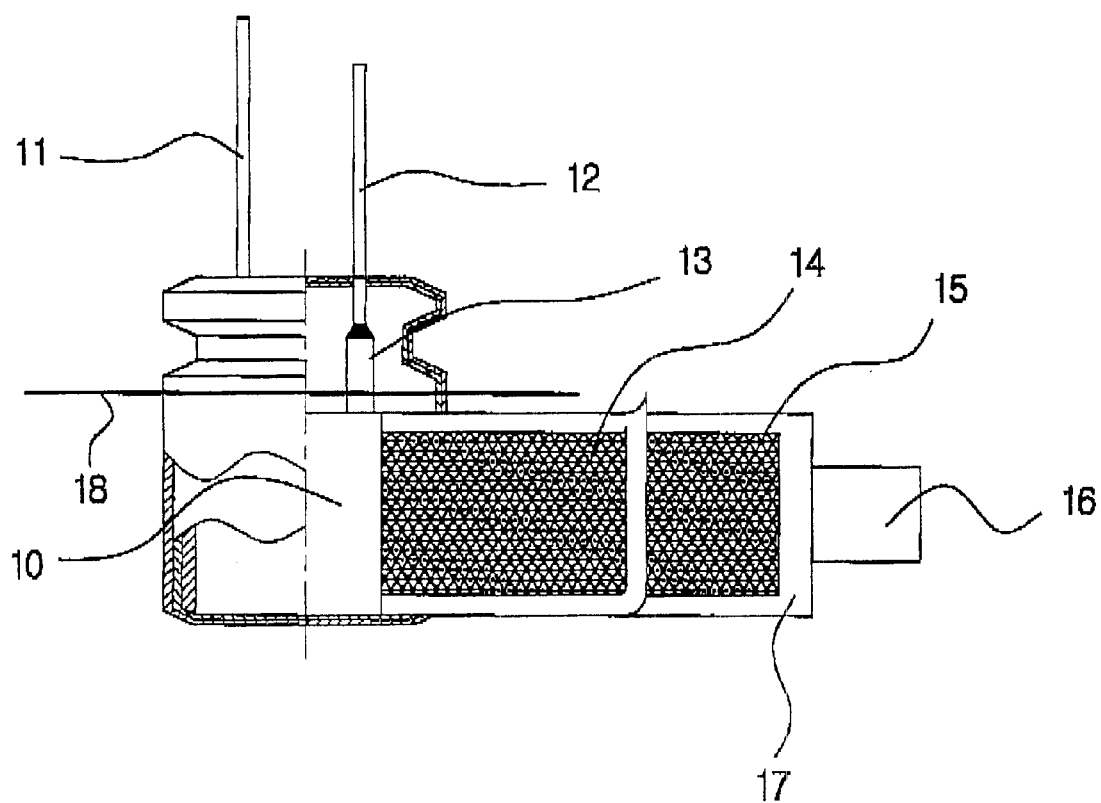
FIG. 1 is a diagram of a solid electrolytic capacitor using a functional polymer prepared according to the method of the present invention.

Conventional impregnation methods of conductive polymers, such as polypyrrole, are characterized in that an electrolyte is formed on an insulating, dielectric oxide film by chemical and electrolytic polymerization. In this regard, a conductive polymer film and manganese dioxide are precoated on a nuclear film to form a nuclear precoat layer before the electrolytic polymerization.

When the electrode is flat, the conventional method may be useful. However, in the case of the rolled device, the precoat layer cannot be uniformly formed on the oxide film and so electrolytic polymerization is unstably carried out, which leads to poor properties and reliability of a final product, complicated conductive polymer preparation processes, and difficult control of the process condition.

Meanwhile, the representative precoat layer is formed by oxidative polymerization of pyrrole. Performed in a solution containing pyrrole and an oxidizing agent, the oxidative polymerization varies in polymerization degree depending on the concentration distribution of pyrrole and oxidizing agent. Further, constant conditions must be maintained on the surface on which the oxidative polymerization is being done. In this regard, the flat electrodes can be controllably subjected to constant conditions with ease while providing sufficient pyrrole and oxidizing agent. In contrast, the rolled type electrode is difficult to control because pyrrole and oxidizing agent cannot be sufficiently supplied to the inside of the device and there is great difference in polymerization degree over the device.

To overcome said problems, a functional polymer useful as a solid electrolyte is applied in a solution form for the manufacture of solid electrolytic capacitors for rolled aluminum devices with high performance and high reliability in accordance with the present invention.

A detailed description will be given of the method for preparing the solid electrolytic capacitor using the functional polymer according to the present invention, below.

In the present invention, polyaniline, which is highly conductive, is used as a solid electrolyte. A polyaniline solution is found to be of such good impregnation efficiency as to penetrate to the inside of the rolled device, where it is difficult to impregnate electrolytic solution of pyrrole, whereby the rolled device can be endowed with excellent electrical properties and reliability. Additionally, the functional polymer of the present invention enjoys the advantage of being much less expensive, compared to TCNQ complex, and the preparation process is simplified.

Polyaniline Emeraldine base powder (1.0–5.0 wt %) synthesized by oxidative polymerization is mixed with camphorsulfonic acid (CSA), which serves as a dopant, in the molar ratio of 1:2. After being finely pulverized with a rod mill, the admixture of polyaniline powder and CSA is added in an amount of 6% by weight to a solvent mixture of trifluoroacetic acid ($CF_3COOH$) and m-cresol in a weight proportion of 47%:47%. Stirring with a magnetic stirrer gives a conductive polyaniline solution, In thusly prepared polyaniline solution, a rolled device is thoroughly immersed up to the soldering portion of its lead wires and thus impregnated with the conductive polyaniline. Subsequently, in order to fully remove the solvent, the impregnated device is heat-treated under reduced pressure for 10 minutes within a vacuum drying oven which is maintained at 100° C. and 20 cmHg, and dried to form the solid electrolyte on the device.

In the present invention, conventional intricate processes, for instance, the chemical polymerization and electrolytic polymerization that have been repeatedly performed so as to form the layer of the solid electrolyte of polypyrrole and aniline, are dispensed with. Uniform impregnation to the inside of the rolled device cannot be achieved by such chemical and electrolytic polymerization, so that poor electrical properties and reliability result. By contrast, the conductive polymer solution of the present invention can reach deep inside rolled devices thanks to its low surface tension and viscosity, easily achieving the impregnation thereof by capillary and diffusion effects at normal temperature and pressure and thus resulting in the formation of a uniform solid electrolyte layer. Therefore, the capacitors thus obtained have advantages of larger capacity, lower impedance in a high frequency region, ESR and loss value, compared to the conventional products.

Over the dissolution-impregnation method using TCNQ complex, which is carried out in high temperature working conditions the present invention using polyaniline electrolytic solution has the advantages in that the impregnation can be simply accomplished under normal conditions. Above all, the present invention enjoys a great advantage in that polyaniline costs about $\frac{1}{50}$ the price of TCNQ complex.

With reference to FIG. 1, there is shown an example of a solid electrolytic capacitor using the functional polymer prepared according to the present invention.

In this figure, reference numeral 11 designates an anode lead wire; 12, a cathode lead wire; 13, an aluminum can; 14, an anode aluminum thin film; 15, a cathode aluminum thin film; 16, an adhesive tape; 17, a separator paper of anode and cathode; 18, a device position to be immersed; and 10 a capacitor device.

A better understanding of the present invention may be obtained in light of the following examples which are set forth to illustrate, but are not to be construed to limit the present invention.

EXAMPLE

An electrode lead was attached to each of an aluminum etching thin film and a cathode thin film formed at 14 V, and rolled, together with a separator paper, to prepare a device, which was then immersed in a conductive polyaniline electrolytic solution and thus impregnated.

Example 1

In order to prepare a conductive polymer electrolytic solution, as solvents, use might be made of a mixture of 42.5–48.5 wt % of trifluoroacetic acid ($CF_3COOH$) and 42.5–48.5 wt % of m-cresol, or a mixture of 20.0–30.0 wt % of trifluoroacetic acid ($CF_3COOH$) and 55.0–75.0 wt % of trifluoroethanol ($CF_3CH_2OH$). As such, trifluoroacetic acid might be replaced with formic acid or acetic acid, and m-cresol be replaced with p-cresol or NMP.

Thusly obtained mixture solvent was added with 0.2–0.6 wt % of dioctyl sulfo succinate sodium salt as a surfactant and dissolved.

Emeraldine base powder (1.0–5.0 wt %) of polyaniline was mixed with camphorsulfonic acid (CSA), a dopant, in a molar ratio of 1:2 and pulverized by use of a rod mill or a ball mill, and added to surfactant-dissolved solvent and then dissolved with stirring using a homogenizer, a magnetic stirrer, an attritor or an emulsifier, to prepare a conductive polyaniline electrolytic solution. The dopant CSA may be replaced with boric acid, succinic acid or ethylene carbonate. An alternative for the surfactant dioctyl sulfo succinate sodium salt may be selected from phosphate ester based anionic surfactants, 3-(trimethoxysilyl) propyl methacrylate and 3-aminopropyl triethoxysilane.

The rolled device was immersed in said conductive polyaniline electrolytic solution at a rate of 0.5–10 mm/sec and then taken out from the solution at the same rate, followed by drying the device at 80–150° C. for 5–30 minutes in a drying oven. The thoroughly dried impregnated device was inserted to an aluminum can, sealed, and cured with epoxy resin, urethane or acryl resin, to manufacture a functional polymer solid electrolytic capacitor.

Example 2

Polyaniline Emeraldine base powder (1.0–5.0 wt %) and dodecylbenzenesulfonic acid were weighed in the molar ratio of 1:4, mixed and pulverized with a rod mill or a 3 roll mill. The pulverized paste type high viscosity solution was added to 69–91 wt % of chloroform ($CHCl_3$) solvent in the amount of 2.0–20.0 wt %, and dissolved with stirring by use of a homogenizer, a magnetic stirrer, an attritor or an emulsifier. Ethyleneglycol monobutyl ether was added in the amount corresponding to 10 wt % of said chloroform solvent so that volatility of the solution was decreased, to prepare a precoating solution.

Also usable in place of said chloroform is acetonitrile, n-butyl alcohol, tetrahydro furfuryl alcohol, iso-propyl alcohol, $CCl_4$, MEK, MIBK, cyclohexanone, propylene carbonate, sulfolane, acetic acid ethyl ester, acetic acid butyl ester, iso-butyl alcohol, and diacetone alcohol. In addition, usable in place of said ethyleneglycol monobutyl ether is ethylene glycol monoethyl ether, diethylene glycol monoethyl ether, diethylene glycol monobutyl ether, diethylene glycol monoethyl ether acetate, diethylene glycol monobutyl ether acetate ethylene glycol monoethyl ether acetate, and ethylene glycol monobutyl ether acetate.

The rolled device was immersed in the precoating solution at the rate of 0.5–10 mm/sec and then taken out from the solution at the same rate, followed by drying the device at 50–100° C. for 10 seconds - 5 minutes in a drying oven.

Subsequently, the precoated rolled device was secondarily immersed in said conductive polymer electrolytic solution used in the example 1, and thus impregnated with solid electrolytes, according to the same method and condition in the example 1.

That is to say, the precoated rolled device was immersed in the conductive polyaniline electrolytic solution at the rate of 0.5–10 mm/sec and then taken out from the solution at the same rate, followed by drying the device at 80–150° C. for 5–30 minutes in a drying oven. The thoroughly dried impregnated device was inserted to an aluminum can, sealed and cured with epoxy resin, urethane or acryl resin, to produce a functional polymer solid electrolytic capacitor.

Comparative Example 1

TCNQ complex powder used as organic semiconductor solid electrolytic capacitor was previously introduced to the aluminum can in a suitable amount, heated to 310° C. Then, the prepared capacitor device was inserted to the aluminum can, impregnated with TCXQ complex, cooled, sealed and cured with epoxy resin, thereby manufacturing a organic semiconductor solid electrolytic capacitor.

Comparative Example 2

A device having the same shape as in said comparative example was alternately immersed in a pyrrole solution and an ammonium peroxy disulfate $[(NH_4)_2S_2O_8]$ solution and oxidative-polymerized, thereby forming a precoating layer of polypyrrole on the device. Then, the electrolytic polymerization was carried out by use of a solution of 0.05 mol pyrrole, 0.025 mol p-toluene sulfonic acid, and tri-n-butyl amine in acetonitrile at 2 $mA/cm^2$ for 1 hour. The device was simply washed and dried, followed by inserting to the aluminum can, sealing and curing with epoxy resin, to manufacture a solid electrolytic capacitor.

Results and Conclusion

From the results of the following table 1, it can be seen that, comparing the examples according to the present invention with the comparative examples according to the conventional techniques, the solid electrolytic capacitor prepared according to the method of the present invention has more excellent tanδ, ESR and leakage current characteristics, showing impregnation efficiency, and higher electrostatic capacity than conventional capacitors.

TABLE 1

| Example No. | Electrostatic capacity ($\mu$F) | Tanδ | 100 kHz ESR ($\Omega$) | Leakage current ($\mu$A) |
|---|---|---|---|---|
| 1 | 35.3 | 0.021 | 0.057 | 2.2 |
| 2 | 35.7 | 0.019 | 0.038 | 2.1 |
| C. 1 | 33.2 | 0.029 | 0.067 | 5.6 |
| C. 2 | 34.0 | 0.033 | 0.081 | 9.9 |

As stated above, the solid electrolytic capacitor prepared according to the method of the present invention is advantageous in terms of ease of impregnation, high impregnation efficiency, low leakage current and large electrostatic capacity. As well, the rolled device can be simply immersed in the conductive polymer solution at normal temperature and pressure, thereby forming a solid electrolyte layer, thus having high impregnation efficiency. Therefore, the processes and conditions used in the present method become simplified, compared to the conventional methods. So, reliability of products and other properties can be improved, and a unit price of conductive polymer solution is very low so that preparation cost of products can be greatly lowered, thus the practical and industrial values of products becoming greater.

The functional polymer solid electrolytic capacitor of the present invention can be applied to the fields of electrical and electronic instruments, such as TV, VCR, PC, notebook PC and the like, which require voltage smoothing, noise removal and low ESR in a high frequency region.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for manufacturing a solid electrolytic capacitor, comprising the following steps of:

rolling electrode lead-attached thin films of an etched aluminum and a cathode, together with a separator paper, to make a rolled device (S1);

mixing an admixture of polyaniline Emeraldine base powder and a dopant in a molar ratio of 1:2, pulverized by use of a rod mill or a ball mill, with a solution of 0.2–0.6 wt % of surfactant in equimolar amounts of a first solvent and a second solvent, and dissolving the pulverized mixture with stirring by use of a dissolution apparatus, to prepare a solution of a conductive polyaniline solid electrolyte (S2); and immersing said rolled device in said solution of conductive polyaniline solid electrolyte at a rate of 0.5–10 mm/sec, taking out the device from the solution at the same rate, and drying the device at 80–150° C. for 5–30 minutes in a drying oven, followed by inserting the fully dried impregnated device to an aluminum can, to seal and cure the inserted device with epoxy resin, urethane or acryl resin (S3).

2. The method as defined in claim 1, wherein the first solvent is selected from the group consisting of trifluoroacetic acid ($CF_3COOH$), trifluoroethanol ($CF_3CH_2OH$), formic acid or acetic acid.

3. The method as defined in claim 1, wherein the second solvent is selected from the group consisting of m-cresol, p-cresol or NMP.

4. The method as defined in claim 1, wherein the dopant is selected from the group consisting of camphorsulfonic acid (CSA), boric acid, succinic acid or ethylene carbonate.

5. The method as defined in claim 1, wherein the surfactant is selected from the group consisting of dioctyl sulfo succinate sodium salt, phosphate ester based anionic surfactant, 3-(trimethoxysilyl) propyl methacrylate or 3-aminopropyl triethoxysilane.

6. A method for manufacturing a solid electrolytic capacitor using a functional polymer, comprising the following steps of:

rolling electrode lead-attached thin films of an etched aluminum and a cathode, together with a separator paper, to make a rolled device (S1);

mixing 2.0–20.0 wt % of a paste type solution of polyaniline Emeraldine base powder in dodecylbenzenesulfonic acid in a molar ratio of 1:4, pulverized by use of a rod mill or a 3 roll mill, with 69–91 wt % of a first solvent, dissolving the pulverized mixture with stirring by use of a dissolution apparatus, followed by adding a second solvent in the amount corresponding to 10 wt % of the first solvent to decrease volatility of the solution, to prepare a precoating solution (S2):

immersing said rolled device in said precoating solution at a rate of 0.5–10 mm/sec, taking out the device from the solution at the same rate, and drying the device at 50–100° C. for 10 seconds -5 minutes in a drying oven (S3);

mixing an admixture of polyaniline Emraldine base powder and a dopant in a molar ratio of 1:2, pulverized by use of a rod mill or a ball mill, with a solution or 0.2–0.6 wt % of surfactant in equimolar amounts of a third solvent and a fourth solvent, and dissolving the pulverized mixture with stirring by use of a dissolution apparatus, to prepare a solution of a conductive polyaniline solid electrolyte (S4); and immersing the rolled device precoated at previous step (S3) in said solution of conductive polyaniline solid electrolyte at a rate of 0.5–10 mm/sec, taking out the device from the solution at the same rate, and drying the device at 80–150° C. for 5–30 minutes in a drying oven, followed by inserting the fully dried impregnated device to an aluminum can, to seal and cure the inserted device with epoxy resin, urethane or acryl resin (S5).

7. The method as defined in claim 6, wherein the first solvent is selected from the group consisting of chloroform, acetonitrile, n-butyl alcohol, tetrahydro furfuryl alcohol, iso-propyl alcohol, $CCl_4$, MEK, MIBK, cyclohexanone, propylene carbonate, sultolane, acetic acid ethyl ester, acetic acid butyl ester, iso-butyl alcohol and diacetone alcohol.

8. The method as defined in claim 6, wherein the second solvent is selected from the group consisting of ethyleneglycol monobutyl ether, ethylene glycol monoethyl ether, diethylene glycol monoethyl ether, diethylene glycol monobutyl ether, diethylene glycol monoethyl ether acetate, diethylene glycol monobutyl ether acetate, ethylene glycol monoethyl ether acetate, and ethylene glycol monobutyl ether acetate.

9. The method as defined in claim 6, wherein the third solvent is selected from the group consisting of trifluoroacetic acid ($CF_3COOH$), trifluoroethanol ($CF_3CH_2OH$), formic acid or acetic acid.

10. The method as defined in claim 6, wherein the fourth solvent is selected from the group consisting of m-cresol, p-cresol or NMP.

11. The method as defined in claim 6, wherein the dopant is selected from the group consisting of camphorsulfonic acid (CSA), boric acid, succinic acid or ethylene carbonate.

12. The method as defined in claim 6, wherein the surfactant is selected from the group consisting of dioctyl sulfo succinate sodium salt, phosphate ester based anionic surfactant, 3-(trirnethoxysilyl) propyl methacrylate or 3-aminopropyl triethoxysilane.

* * * * *